(12) United States Patent
Cai et al.

(10) Patent No.: US 11,548,801 B2
(45) Date of Patent: Jan. 10, 2023

(54) EFFICIENT SELF-CIRCULATION BIOLOGICAL DENITRIFICATION DEVICE AND WORKING METHOD THEREFOR

(71) Applicant: CHUANGTSING ECOLOGICAL ENVIRONMENT(NINGBO) CO., LTD., Ningbo (CN)

(72) Inventors: Jianming Cai, Ningbo (CN); Bibo Zhou, Ningbo (CN)

(73) Assignee: CHUANGTSING ECOLOGICAL ENVIRONMENT (NINGBO) CO., LTD., Ningbo (CN)

( * ) Notice: Subject to any disclaimer, the term of this patent is extended or adjusted under 35 U.S.C. 154(b) by 0 days.

(21) Appl. No.: 17/638,922

(22) PCT Filed: Jun. 24, 2020

(86) PCT No.: PCT/CN2020/098067
§ 371 (c)(1),
(2) Date: Feb. 28, 2022

(87) PCT Pub. No.: WO2021/036458
PCT Pub. Date: Mar. 4, 2021

(65) Prior Publication Data
US 2022/0298042 A1 Sep. 22, 2022

(30) Foreign Application Priority Data
Aug. 30, 2019 (CN) .......................... 201910817874.9

(51) Int. Cl.
*C02F 3/30* (2006.01)
*C02F 1/00* (2006.01)
(Continued)

(52) U.S. Cl.
CPC .............. *C02F 3/305* (2013.01); *C02F 1/006* (2013.01); *C02F 3/208* (2013.01); *C02F 3/301* (2013.01);
(Continued)

(58) Field of Classification Search
CPC .......... C02F 3/305; C02F 1/006; C02F 3/208; C02F 3/301; C02F 3/308; C02F 2001/007; C02F 2101/16; C02F 2203/006
(Continued)

(56) References Cited

U.S. PATENT DOCUMENTS 9,758,411 B2 * 9/2017 Valdes Simancas .... C02F 3/305
2010/0133158 A1 6/2010 Zhu et al.

FOREIGN PATENT DOCUMENTS

CA 2246296 C 10/2004
CN 103395874 A 11/2013
(Continued)

OTHER PUBLICATIONS

GB 18918—2002, Discharge standard of pollutants for municipal wastewater treatment plant, General Administration of Quality Supervision, Inspection and Quarantine of the People's Republic of China; Ministry of Ecology and Environment of the People's Republic of China, 2002, pp. 1-11.
(Continued)

*Primary Examiner* — Fred Prince
(74) *Attorney, Agent, or Firm* — Bayramoglu Law Offices LLC

(57) ABSTRACT

A self-circulating high-efficiency biological denitrification device includes a tank body, where an aerobic zone, an anoxic zone, a settling tank water distribution zone, a sludge zone, a sludge-water separation zone, and an effluent flow stabilization zone are arranged from bottom to top in the tank body; the settling tank water distribution zone includes
(Continued)

a settling tank influent guide cylinder, and a circular butterfly jet water distributor is arranged between the settling tank influent guide cylinder and the aerobic zone; the settling tank influent guide cylinder is connected to a guide plate arranged in the aerobic zone, the anaerobic zone, and the sludge zone; the guide plate includes three sections; a nitrification liquid return gap and a sludge return gap are formed; a bottom of the aerobic zone is provided with an aerator; the aerator is connected to an air inlet pipe located outside the tank body.

7 Claims, 2 Drawing Sheets

(51) Int. Cl.
 *C02F 3/20* (2006.01)
 *C02F 101/16* (2006.01)
(52) U.S. Cl.
 CPC ........ *C02F 3/308* (2013.01); *C02F 2001/007* (2013.01); *C02F 2101/16* (2013.01); *C02F 2203/006* (2013.01)

(58) Field of Classification Search
 USPC ....... 210/603, 605, 615, 616, 617, 630, 259, 210/903, 150
 See application file for complete search history.

(56) References Cited

FOREIGN PATENT DOCUMENTS

| | | |
|---|---|---|
| CN | 103435155 A | 12/2013 |
| CN | 106242050 B | 4/2019 |
| CN | 110776099 A | 2/2020 |
| CN | 210505759 U | 5/2020 |

OTHER PUBLICATIONS

GB50014—2006, Code for design of outdoor wastewater engineering, Ministry of Housing and Urban-Rural Development of The People's Republic of China, 2006.

\* cited by examiner

EFFICIENT SELF-CIRCULATION BIOLOGICAL DENITRIFICATION DEVICE AND WORKING METHOD THEREFOR

CROSS REFERENCE TO THE RELATED APPLICATIONS

This application is the national phase entry of International Application No. PCT/CN2020/098067, filed on Jun. 24, 2020, which is based upon and claims priority to Chinese Patent Application No. 201910817874.9, filed on Aug. 30, 2019, the entire contents of which are incorporated herein by reference.

TECHNICAL FIELD

The present disclosure relates to the fields of environmental protection and sewage treatment, and specifically relates to a self-circulating high-efficiency biological denitrification device and a working process thereof, which are suitable for denitrification and dephosphorization of domestic sewage with a low carbon-to-nitrogen ratio.

BACKGROUND

Nitrogen and phosphorus are the main factors that cause water eutrophication. Mainstream treatment processes for nitrogen and phosphorus include an anaerobic/oxic (A/O) process, an anaerobic/anoxic/oxic ($A^2/O$) process, oxidation ditch (OD) and sequencing batch reactor (SBR) series, various biofilm and membrane bioreactor (MBR) processes, and the like. In all of the treatment processes, it is necessary to create a suitable dissolved oxygen (DO) environment, cultivate a dominant microbial flora, and design an economical return ratio to achieve the effect of biological denitrification.

The denitrification in the prior art generally adopts a combined reactor composed of a denitrification reactor and a secondary settling tank that are horizontally connected in series. A circulating water pipe and a circulating sludge pipe of the reactor are each provided with a circulating pump or each adopt a pump for returning, which is a traditional method and is not energy-efficient. In addition, the denitrification reactor of the combined reactor requires a micro-aerobic environment with a DO concentration of 0.6 mg/L to 0.8 mg/L, which is difficult to control under the accuracy of existing instruments; and sludge deposition is inevitable due to insufficient aeration and stirring intensity.

Chinese patent CN106242050B discloses a vertical internally-circulating integrated sewage treatment device, including a stripping zone, an aerobic zone, an anoxic zone, and an anaerobic zone that are sequentially arranged from top to bottom. In the above solution, reactors with different functions such as anaerobic, anoxic, aerobic, and settling functions are vertically stacked; a three-phase separator is arranged in each of the anaerobic zone and the anoxic zone, and a circulating pump is arranged between the three-phase separator and a bottom of the anaerobic zone; the stripping zone is arranged at a top of the aerobic zone; and a filler zone is arranged at a top of an inclined plate settling zone.

The above solution still adopts a conventional circulating pump in the prior art for water circulation, which consumes a relatively large amount of energy. In addition, the above solution has the following problem: in order to ensure that sludge in each of the anaerobic zone and the anoxic zone is suspended, it is necessary to increase an upflow velocity inside the reactor; and in order to maintain a specified upflow velocity, a slenderness ratio or an internal circulation volume of the reactor has to be improved. If the slenderness ratio is increased, the potential safety hazard will be increased; and if the internal circulation volume is increased, the energy consumption will be increased. A ceramsite filler layer is arranged above an inclined plate layer, which is very easy to cause blockage. The above patent does not mention a countermeasure to delay the filler blockage.

SUMMARY

In view of the deficiencies of the prior art, the present disclosure is intended to provide a self-circulating high-efficiency biological denitrification device and a working process thereof, which involves rich biofacies, makes full use of carbon sources in sewage, uses the residual pressure of aeration for returning and thus omits a return pump, and reduces energy consumption.

The above-mentioned objective of the present disclosure is achieved through the following technical solutions: A self-circulating high-efficiency biological denitrification device is provided, including a tank body, where an aerobic zone, an anoxic zone, a settling tank water distribution zone, a sludge zone, a sludge-water separation zone, and an effluent flow stabilization zone are arranged from bottom to top in the tank body; the aerobic zone and the anoxic zone are located at a same level, and the aerobic zone is located inside the anoxic zone; a vertical middle partition wall is provided between the aerobic zone and the anoxic zone, and a through hole penetrates through a bottom of the middle partition wall;

the settling tank water distribution zone includes a settling tank influent guide cylinder located at a center of the tank body, a water distributor is arranged between a bottom of the settling tank influent guide cylinder and a top of the aerobic zone, and the water distributor is a circular butterfly jet water distributor;

the water distributor includes a water inlet pipe communicating with an outside of the tank body and a plurality of sets of water distribution pipes arranged in a diffused shape, and each set of the plurality of sets of water distribution pipes passes through the middle partition wall;

the settling tank influent guide cylinder is connected to a guide plate arranged in the aerobic zone, the anaerobic zone, and the sludge zone; the guide plate is configured for three-phase separation and returning, and includes three sections: a top plate, a middle-section inclined plate, and a vertical section; the top plate is arranged obliquely and separates the settling tank water distribution zone and the aerobic zone; the middle-section inclined plate separates a settling tank sludge bucket and the anoxic zone and forms an included angle of 55° with a horizontal plane, a nitrification liquid return gap is formed between the middle-section inclined plate and the middle partition wall, and the sludge zone is located on an upper part of the middle-section inclined plate of the guide plate; a sludge return gap is formed between the vertical section and an outer wall of the tank body;

a bottom of the aerobic zone is provided with an aerator to provide a return power; the aerator is connected to an air inlet pipe located outside the tank body; and the aerator realizes a nitrification liquid return through an exhaust gas pressure of aeration, and realizes a sludge return through a negative-pressure suction generated by aeration.

When the above technical solution is adopted, sewage is evenly distributed to the anoxic zone through the water distributor, and is fully mixed with a nitrification liquid returned from the aerobic zone through the aerator at the bottom of the aerobic zone to allow denitrification in the anoxic zone; a nitrification liquid return gap is formed on a top of each of the aerobic zone and the anoxic zone through the guide plate, and a return power is provided through an exhaust gas of aeration in the aerobic zone; a sludge return gap is formed between the anoxic zone and the sludge zone through the guide plate, and a return power is provided through a negative-pressure suction generated by the aeration in the aerobic zone; and sludge accumulates in the sludge zone and is filtered through an oblique filler in the sludge-water separation zone, and an effluent is discharged through the water outlet pipe in the effluent flow stabilization zone, where an included angle between the top plate of the guide plate and the horizontal plane is set to 15°; an included angle between the middle-section inclined plate of the guide plate and the horizontal plane is set to 55°; and a length of the vertical section of the guide plate is set to 30 cm, and a distance between the vertical section of the guide plate and the outer wall of the reactor is set to 3 cm. Through the cooperation of a guide plate design with an unique shape and an aerator, the return is achieved without a circulating pump, resulting in energy conservation, emission reduction, and structural optimization.

Preferably, a top edge of the effluent flow stabilization zone may be provided with an effluent weir, and the effluent weir may communicate with a water outlet pipe located outside the tank body; and a top of the guide plate may be vertically connected to an air duct, and the air duct may be located outside the tank body and connected to a ventilation cap.

When the above technical solution is adopted, nitrogen and an exhaust gas generated in the aerobic zone are released through the air duct, and the air duct cooperates with the ventilation cap to release nitrogen generated by denitrification and an exhaust gas generated in the aeration zone, such as to prevent the reactor from generating gas lock.

Preferably, the aerobic zone may be filled with a suspended filler of an optional material at a filling percentage of 50% to 70%.

When the above technical solution is adopted, different suspended fillers can be adopted for different water qualities, and in an embodiment, polyurethane (PU) is adopted as the suspended filler, with a specific surface area (SSA) of 20,000 $m^2/m^3$ and a filling percentage of 15%.

Preferably, a filler may be filled in the sludge-water separation zone, and the filler may be arranged as an inclined tube or an inclined plate.

When the above technical solution is adopted, the inclined tube or the inclined plate has an arrangement angle of 65° to 70° and a height of 1.0 m to 1.2 μm.

Preferably, the aerator may be a single-hole membrane aerator, with an arrangement density of 36 to 64 aerators per $m^2$.

When the above technical solution is adopted, air distribution pipes and water distribution pipes are each an acrylonitrile-butadiene-styrene (ABS) or unplasticized polyvinyl chloride (UPVC) plastic rigid pipe; and the single-hole membrane aerator is made of ABS, which consists of an upper pipe clamp, a lower pipe clamp, a single-hole membrane, an ABS fixed adjustment bracket, and the like.

Preferably, a material of the tank body may be reinforced concrete, an anti-corrosive carbon steel, a stainless steel plate, or a plastic plate.

When the above technical solution is adopted, the tank body can be made of various materials to adapt to different environments and needs.

Preferably, a shape of the tank body may be a cylinder, a rectangular solid, or a cube; and a top-view shape of the guide plate may match with a top-view shape of the tank body.

When the above technical solution is adopted, the tank body can be arranged in various shapes to adapt to different environments and assembly processing requirements.

A working process of a self-circulating high-efficiency biological denitrification device is provided, including the following steps:

(1) evenly distributing sewage to an anoxic zone through a water distributor, fully mixing the sewage with a nitrification liquid returned from an aerobic zone through an aerator at a bottom of the aerobic zone to allow denitrification in the anoxic zone; and releasing nitrogen and an exhaust gas generated in the aerobic zone through an air duct;

(2) forming a nitrification liquid return gap on a top of each of the aerobic zone and the anoxic zone through a guide plate, and providing a return power through an exhaust gas of aeration in the aerobic zone;

(3) forming a sludge return gap between the anoxic zone and a sludge zone through a guide plate, and providing a return power through a negative-pressure suction generated by aeration in the aerobic zone; and (4) allowing sludge to accumulate in the sludge zone, filtering the sludge through an oblique filler in a sludge-water separation zone, and discharging an effluent through a water outlet pipe in the effluent flow stabilization zone.

In summary, the present disclosure has the following beneficial effects.

1. The present disclosure requires low energy consumption. The device design in the present disclosure utilizes the basic principle of fluid mechanics to realize the return of a nitrification liquid and sludge without a return pump, thereby reducing the energy consumption.

2. The present disclosure adopts a single-hole membrane aerator, which makes aeration uniform, improves the utilization of oxygen, reduces the air supply, and reduces the energy consumption.

3. The present disclosure adopts a sludge-membrane dual system to treat sewage, where a sludge age of a sludge system is controlled within 5 days, which is beneficial to biological dephosphorization; and a sludge age of a membrane system is generally about 15 days (an aged biofilm will automatically fall off), which is beneficial to nitrification.

4. In the present disclosure, a settling zone is stacked on a bioreactor, which reduces the floor space, reduces the restriction to a sludge return ratio, and can reduce a width of a return gap and a volume of the settling zone under the same conditions.

Figure 1:
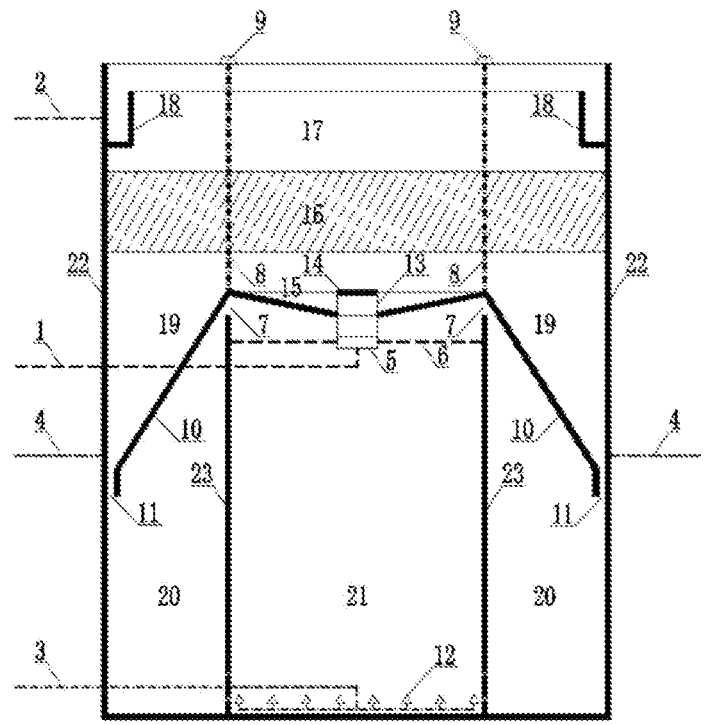
FIG. 1 is a schematic diagram of an overall structure of an embodiment.

Reference numerals: 1 represents a water inlet pipe; 2 represents a water outlet pipe; 3 represents an air inlet pipe; 4 represents a tank body; 5 represents a water distributor; 6 represents a water distribution pipe; 7 represents a nitrification liquid return gap; 8 represents an air duct; 9 represents a ventilation cap; 10 represents a guide plate; 11 represents a sludge return gap; 12 represents an aerator; 13 represents a settling tank influent guide cylinder; 14 represents a guide cylinder partition; 15 represents a settling tank water distribution zone; 16 represents a sludge-water separation zone; 17 represents an effluent flow stabilization zone; 18 represents an effluent weir; 19 represents a sludge zone; 20 represents an anoxic zone; 21 represents an aerobic zone; 22 represents a reactor tank wall; and 23 represents a middle partition wall.

DETAILED DESCRIPTION OF THE EMBODIMENTS

The specific embodiments of the present disclosure will be described in detail below with reference to the accompanying drawings.

Example 1: As shown in FIG. 1, a self-circulating high-efficiency biological denitrification device is provided, including a tank body, where a material of the tank body may be reinforced concrete, an anti-corrosive carbon steel, a stainless steel plate, or a plastic plate. The tank body can be made of various materials to adapt to different environments and needs. A shape of the tank body may be a cylinder, a rectangular solid, or a cube; and a top-view shape of the guide plate may match with a top-view shape of the tank body. In this example, a cylindrical tank body is adopted, which presents as circular from a top view.

As shown in FIG. 1, an aerobic zone, an anoxic zone, a settling tank water distribution zone, a sludge zone, a sludge-water separation zone, and an effluent flow stabilization zone are arranged from bottom to top in the tank body; the aerobic zone and the anoxic zone are located at a same level, and the aerobic zone is located inside the anoxic zone; a vertical middle partition wall is provided between the aerobic zone and the anoxic zone, and a through hole penetrates through a bottom of the middle partition wall; and the settling tank water distribution zone includes a settling tank influent guide cylinder located at a center of the tank body, and a water distributor is arranged between a bottom of the settling tank influent guide cylinder and a top of the aerobic zone.

Figure 3:
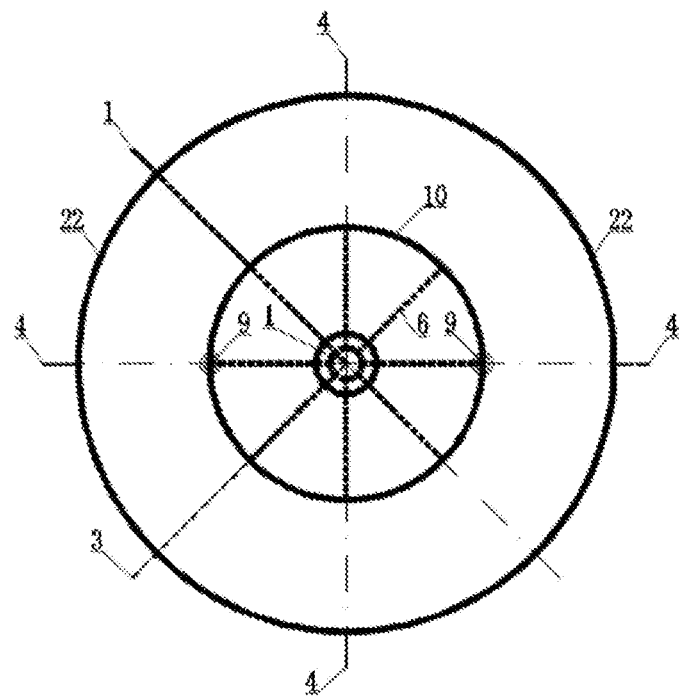
FIG. 3 is a schematic diagram of a middle part of an embodiment.

As shown in FIG. 1 and FIG. 3, the water distributor is a circular butterfly jet water distributor, which is made of a glass fiber reinforced plastic, a carbon steel (anti-corrosive), or a stainless steel; and the water distributor includes a water inlet pipe communicating with an outside of the tank body and a plurality of sets of water distribution pipes arranged in a diffused shape, and each set of the plurality of sets of water distribution pipes passes through the middle partition wall. In this example, one water inlet pipe and eight water distribution pipes are adopted, which are arranged in a center of the tank body and located at a top of the aerobic zone and a bottom of the settling tank influent guide cylinder; and the settling tank influent guide cylinder is a screen pipe, a bottom of which is close to a reactor influent distributor 5 and a top of which is a solid partition 14 with a height of 1 m.

As shown FIG. 1, the settling tank influent guide cylinder is connected to a guide plate arranged in the aerobic zone, the anaerobic zone, and the sludge zone; the guide plate is configured for three-phase separation and returning, and includes three sections: a top plate, a middle-section inclined plate, and a vertical section; the top plate is arranged obliquely and separates the settling tank water distribution zone and the aerobic zone; the middle-section inclined plate separates a settling tank sludge bucket and the anoxic zone and forms an included angle of 55° with a horizontal plane, a nitrification liquid return gap with a width of 30 cm is formed between the middle-section inclined plate and the middle partition wall, and the middle-section inclined plate is made of a glass fiber reinforced plastic, an anti-corrosive carbon steel, or a stainless steel in a structure form of a screen plate, with a void ratio of 50%; and the sludge zone is located on an upper part of the middle-section inclined plate of the guide plate, and a sludge return gap is formed between the vertical section and an outer wall of the tank body.

As shown in FIG. 1, a bottom of the aerobic zone is provided with an aerator to provide a return power; and the aerator is a single-hole membrane aerator, with an arrangement density of 36 to 64 aerators per $m^2$. Air distribution pipes and water distribution pipes are each an ABS or UPVC plastic rigid pipe; and the single-hole membrane aerator is made of ABS, which consists of an upper pipe clamp, a lower pipe clamp, a single-hole membrane, an ABS fixed adjustment bracket, and the like. The aerator is connected to an air inlet pipe located outside the tank body; and the aerator realizes a nitrification liquid return through an exhaust gas pressure of aeration, and realizes a sludge return through a negative-pressure suction generated by aeration. As an optimal solution set in this example, an included angle between the top plate of the guide plate and the horizontal plane may be set to 15°; an included angle between the middle-section inclined plate of the guide plate and the horizontal plane may be set to 55°; and a length of the vertical section of the guide plate may be set to 30 cm, and a distance between the vertical section of the guide plate and the outer wall of the reactor may be set to 3 cm.

As shown in FIG. 1, a top edge of the effluent flow stabilization zone is provided with an effluent weir, the effluent weir communicates with a water outlet pipe located outside the tank body, a top of the guide plate is vertically connected to an air duct, and the air duct is located outside the tank body and connected to a ventilation cap; and nitrogen and an exhaust gas generated in the aerobic zone are released through the air duct, and the air duct cooperates with the ventilation cap to release nitrogen generated by denitrification and an exhaust gas generated in the aeration zone, such as to prevent the reactor from generating gas lock. Sewage is evenly distributed to the anoxic zone through the water distributor, and is fully mixed with a nitrification liquid returned from the aerobic zone through the aerator at the bottom of the aerobic zone to allow denitrification in the anoxic zone; a nitrification liquid return gap is formed on a top of each of the aerobic zone and the anoxic zone through the guide plate, and a return power is provided through an exhaust gas of aeration in the aerobic zone; a sludge return gap is formed between the anoxic zone and the sludge zone through the guide plate, and a return power is provided through a negative-pressure suction generated by the aeration in the aerobic zone; and sludge accumulates in the sludge zone and is filtered through an oblique filler in the sludge-water separation zone, and an effluent is discharged through the water outlet pipe in the effluent flow stabilization zone. Through the cooperation of a guide plate design with a unique shape and an aerator, the return is achieved without a circulating pump, resulting in energy conservation, emission reduction, and structural optimization.

Figure 2:
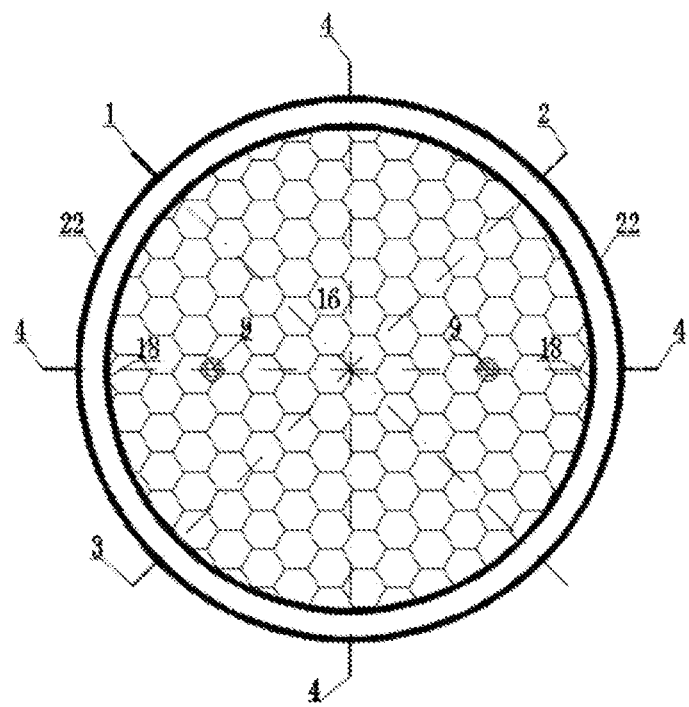
FIG. 2 is a schematic diagram of an upper part of an overall structure of an embodiment.
Figure 4:
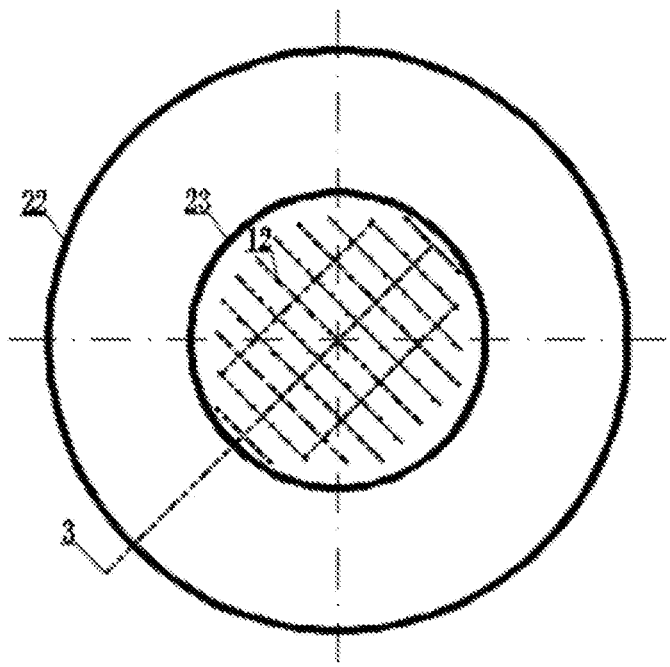
FIG. 4 is a schematic diagram of a bottom structure of an embodiment.

As shown in FIG. 1, FIG. 2, and FIG. 4, the aerobic zone may be filled with a suspended filler of an optional material at a filling percentage of 50% to 70%. Different suspended fillers can be adopted for different water qualities, and in this example, PU is adopted as the suspended filler, with an SSA of 20,000 m²/m³ and a filling percentage of 15%. The sludge-water separation zone is filled with a filler, and the filler is arranged as an inclined tube or an inclined plate, with an arrangement angle of 65° to 70° and a height of 1.0 m to 1.2 m.

A working process of a self-circulating high-efficiency biological denitrification device is provided, including the following steps:

(1) sewage is evenly distributed to an anoxic zone through a water distributor, and is fully mixed with a nitrification liquid returned from an aerobic zone through an aerator at a bottom of the aerobic zone to allow denitrification in the anoxic zone; and nitrogen and an exhaust gas generated in the aerobic zone are released through an air duct;

(2) a nitrification liquid return gap is formed on a top of each of the aerobic zone and the anoxic zone through a guide plate, and a return power is provided through an exhaust gas of aeration in the aerobic zone;

(3) a sludge return gap is formed between the anoxic zone and a sludge zone through a guide plate, and a return power is provided through a negative-pressure suction generated by aeration in the aerobic zone; and (4) sludge accumulates in the sludge zone and is filtered through an oblique filler in a sludge-water separation zone, and an effluent is discharged through a water outlet pipe in the effluent flow stabilization zone.

For example, domestic sewage is treated at 150 m³/d, with an influent quality: CODcr concentration: 250 mg/L, five-day biochemical oxygen demand ($BOD_5$) concentration: 150 mg/L, $N_k$ (Kjeldahl nitrogen) concentration: 30 mg/L, total phosphorus (TP) concentration: 5 mg/L, total suspended solids (TSS) concentration: 250 mg/L, alkalinity SALK concentration: 280 mg/L, and water temperature: 10° C. in winter and 25° C. in summer; and an effluent obtained after the treatment reaches the Class A standard in the Discharge Standard of Pollutants for Municipal Wastewater Treatment Plant (GB 18918-2002), that is, an effluent quality is designed as follows: $BOD_5 \leq 10$ mg/L, $NH_3$—$N \leq 5$ mg/L, total nitrogen (TN)$\leq 15$ mg/L, and TP$\leq 0.5$ mg/L.

The filling percentage for the aerobic zone 21 is 60%, a $BOD_5$ load of the aerobic zone 21 is determined as 1.2 kg $BOD_5/(m^3 \cdot d)$, and a tank volume is 20 m³. The $BOD_5$ load is in the $BOD_5$ load range of 0.2 to 2.0 kg $BOD_5/(m3 \cdot d)$ when a contact oxidation process is conducted in combination with carbonization and nitrification recommended in Article 6.9.11 of the *Code for Design of Outdoor Wastewater Engineering* (GB 50014-2006, 2016 edition), and it can be determined that the aerobic zone 21 in this example can meet the nitrification requirements.

As calculated by the activated sludge method, a volume of the anoxic zone 20 is 20 m³.

Operating parameters of the anoxic zone 20 in summer (calculated water temperature: 25° C.) are as follows: sludge concentration: 2.5 g/L; and denitrification load: 0.045 kg $NO_3$-N/(kg MLSS·d), which is in the denitrification load range of 0.044 to 0.088 kg $NO_3$—N/kg MLSS·d recommended in Article 6.6.18 of the *Code for Design of Outdoor Wastewater Engineering* (GB 50014-2006, 2016 edition), indicating that the denitrification requirements can be met.

Operating parameters of the anoxic zone 20 in winter (calculated water temperature: 10° C.) are as follows: sludge concentration: 5.0 g/L; and denitrification load: 0.023 kg $NO_3$—N/(kg MLSS·d), which is in the denitrification load range of 0.014 to 0.028 kg $NO_3$—N/kg MLSS·d recommended in Article 6.6.18 of the *Code for Design of Outdoor Wastewater Engineering* (GB 50014-2006, 2016 edition), indicating that the denitrification requirements can be met.

The sludge concentration can be adjusted by adjusting a sludge discharge amount.

A total volume of the biochemical reactor in the example is 40 m³, which is 50% less than a tank volume of the ordinary A/O process.

The present disclosure is not limited to the above-mentioned embodiments, and those skilled in the art can make equivalent modifications or substitutions without departing from the spirit of the present disclosure. These modifications or substitutions include all forms of settling (a settling tank in any form)+flotation (a flotation tank in any form), that is, first settling and then flotation. These equivalent modifications or substitutions are all included within the thought and protection ranges defined by the present disclosure.

What is claimed is:

1. A self-circulating biological denitrification device, comprising: a tank body, wherein an aerobic zone, an anoxic zone, a settling tank water distribution zone, a sludge zone, a sludge-water separation zone, and an effluent flow stabilization zone arranged from bottom to top in the tank body; the aerobic zone and the anoxic zone are located at a same level, and the aerobic zone is located inside the anoxic zone; a vertical middle partition wall is provided between the aerobic zone and the anoxic zone, and a through hole penetrates through a bottom of the vertical middle partition wall;

the settling tank water distribution zone comprises a settling tank influent guide cylinder located at a center of the tank body, a water distributor is arranged between a bottom of the settling tank influent guide cylinder and a top of the aerobic zone, and the water distributor is a circular butterfly jet water distributor;

the water distributor comprises a water inlet pipe communicating with an outside of the tank body and a plurality of sets of water distribution pipes arranged in a diffused shape, and each set of the plurality of sets of water distribution pipes passes through the vertical middle partition wall;

the settling tank influent guide cylinder is connected to a guide plate arranged in the aerobic zone, an anaerobic zone, and the sludge zone; the guide plate is configured for three-phase separation and returning, and the guide plate comprises three sections: a top plate, a middle-section inclined plate, and a vertical section; the top plate is arranged obliquely and separates the settling tank water distribution zone and the aerobic zone; the middle-section inclined plate separates a settling tank sludge bucket and the anoxic zone and forms an included angle of 55° with a horizontal plane, a nitrification liquid return gap is formed between the middle-section inclined plate and the vertical middle partition wall, and the sludge zone is located on an upper part of the middle-section inclined plate of the guide plate; a sludge return gap is formed between the vertical section and an outer wall of the tank body;

a bottom of the aerobic zone is provided with an aerator to provide a return power; the aerator is connected to an air inlet pipe located outside the tank body; and the aerator realizes a nitrification liquid return through an exhaust gas pressure of aeration, and realizes a sludge return through a negative-pressure suction generated by aeration.

2. The self-circulating biological denitrification device according to claim 1, wherein a top edge of the effluent flow stabilization zone is provided with an effluent weir, and the effluent weir communicates with a water outlet pipe located outside the tank body; and a top of the guide plate is vertically connected to an air duct, and the air duct is located outside the tank body and connected to a ventilation cap.

3. The self-circulating biological denitrification device according to claim 1, wherein the aerobic zone is filled with a suspended filler of an optional material at a filling percentage of 50% to 70%.

4. The self-circulating biological denitrification device according to claim 1, wherein a filler is filled in the sludge-water separation zone, and the filler is arranged as an inclined tube or an inclined plate.

5. The self-circulating biological denitrification device according to claim 1, wherein the aerator is a single-hole membrane aerator, with an arrangement density of 36 to 64 aerators per square meter.

6. The self-circulating biological denitrification device according to claim 1, wherein a material of the tank body is a reinforced concrete, an anti-corrosive carbon steel, a stainless steel plate, or a plastic plate.

7. The self-circulating biological denitrification device according to claim 1, wherein a shape of the tank body is a cylinder, a rectangular solid, or a cube; and a top-view shape of the guide plate matches with a top-view shape of the tank body.

* * * * *